United States Patent Office 3,272,828
Patented Sept. 13, 1966

3,272,828
5-NITRO-2-FUROYLAMIDOXIMES
Anne Mary Von Esch, North Chicago, and Aldo J. Crovetti, Lake Forest, Ill., assignors to Abbott Laboratories, North Chicago, Ill., a corporation of Illinois
No Drawing. Filed Oct. 9, 1963, Ser. No. 314,849
3 Claims. (Cl. 260—295)

This invention is concerned with compounds of the formula $$R-\underset{NH_2}{\underset{|}{C}}=N-O-\underset{\underset{O}{\|}}{C}\underset{O}{\overset{HC\text{———}CH}{\diagup}}C-NO_2$$

and the method for their preparation. In this and succeeding formulas, R represents hydrogen, loweralkyl, haloloweralkyl, phenyl, aralkyl, aryloxyloweralkyl, loweralkylaminoloweralkyl, dialkylaminoloweralkyl, carboxy, carboloweralkoxy, carboloweralkoxyloweralkyl, carboxamidoloweralkyl, acylaminoloweralkyl, halophenyl, alkoxyphenyl, hydroxyphenyl, cyanoloweralkyl, acylaminophenyl, loweralkylthiophenyl, nitrophenyl, aminophenyl, sulfonamidophenyl, pyridyl, furyl, thienyl, halofuryl, halothienyl, pyrimidyl, oxazyl, isoxazyl, imidazyl, pyrazinyl, thiazyl, isoquinolyl, quinolyl, pyrazyl, pyridyl-loweralkyl, furylloweralkyl or thienylloweralkyl. The terms "loweralkyl" and "loweralkoxy" include the straight and branched alkyl and alkoxy radicals containing from one to five carbon atoms, inclusive.

These novel compounds, and especially those in which R is haloloweralkyl, are active antibacterial and antifungal agents. For this reason, they can be employed in disinfectant compositions to control a variety of microorganisms such as *Salmonella typhimurium, Escherichia coli, Proteus vulgaris* and Alternaria species. In such use the compounds are dispersed on an inert solid or in a suitable liquid (preferably water) and applied as a dust or spray. In a representative operation, good control of the above-named organisms was obtained when the compound wherein R was chloromethyl in the general formula above was employed in an aqueous medium at a concentration of about 50 parts per million. The new compounds are also effective against *Trichomonas vaginalis* when applied topically in concentrations of 50 parts per million or less.

The compounds of the present invention are prepared by the reaction of equimolar proportions of a 5-nitro-2-furoyl halide (preferably the chloride) and a compound of the formula $$R-\underset{NH_2}{\underset{|}{C}}=NOH$$

in the presence of an inert solvent such as acetone and a hydrohalide acceptor such as potassium carbonate. Good results are obtained when the R-substituted amidoxime and hydrohalide acceptor are dissolved in the solvent, cooled to about 0° C. and the 5-nitro-2-furoyl halide also dissolved in the same solvent is added dropwise thereto with rapid stirring. When the addition is complete, stirring is continued at room temperature for several hours. The desired 5-nitro-2-furoylamidoxime which forms is eventually recovered by filtration or concentration, washed with water, dried and recrystallized from a suitable solvent such as acetonitrile or dimethylformamide.

The following examples are presented to illustrate rather than limit the invention.

EXAMPLE 1

*O-(5-nitro-2-furoyl)-p-sulfonamidobenzamidoxime*

$$H_2NO_2S-\!\!\left\langle\!\!\bigcirc\!\!\right\rangle\!\!-\underset{NH_2}{\underset{|}{C}}=N-O-\underset{\underset{O}{\|}}{C}\underset{O}{\overset{HC\text{———}CH}{\diagup}}C-NO_2$$

To 4 grams (0.02 mole) of p-sulfonamidobenzamidoxime melting at 210° C. was added 1.28 grams (0.01 mole) of anhydrous potassium carbonate and 100 ml. of anhydrous acetone. The mixture was cooled to 0° C. and 3.26 grams (0.02 mole) of 5-nitro-2-furoyl chloride melting at 40° C. dissolved in 25 ml. of anhydrous acetone was added with stirring over a period of 15 minutes. The mixture was then stirred at room temperature for an additional 7 hours. The solid which formed was removed by filtration, washed successively with water and ethanol and recrystallized from a dimethylformamide-water mixture at 100° C. to obtain the desired product as a crystalline yellow solid melting at 230° C. (sealed capillary) with decomposition.

*Analysis calculated.*—C=40.68%; H=2.84%; N=15.82%. Found: C=40.84%; H=2.86%; N=15.99%.

EXAMPLE 2

*O-(5-nitro-2-furoyl)-chloroacetamidoxime*

$$ClCH_2-\underset{NH_2}{\underset{|}{C}}=N-O-\underset{\underset{O}{\|}}{C}\underset{O}{\overset{HC\text{———}CH}{\diagup}}C-NO_2$$

By substituting chloroacetamidoxime melting at 87° C. for the p-sulfonamidobenzamidoxime of Example 1, the above named compound was obtained which was found to melt at 165° C. Analysis calculated: C=33.95%; H=2.44%; N=16.97%. Found: C=34.06%; H=2.46%; N=17.09%.

EXAMPLE 3

*O-(5-nitro-2-furoyl)-picolinicamidoxime*

This compound was prepared by the reaction of equimolar quantities of picolinicamidoxime melting at 117° C. and 5-nitro-2-furoyl chloride in the same manner as that described in Example 1. M.P.=216° C. Analysis calculated: C=47.83%; H=2.92%; N=20.29%. Found: C=47.77%; H=3.01%; N=20.45%.

EXAMPLE 4

*O-(5-nitro-2-furoyl)-p-nitrobenzamidoxime*

The reaction of p-nitrobenzamidoxime melting at 169° C. and 5-nitro-2-furoyl chloride in the presence of potassium carbonate and acetone as described in Example 1 produced the desired O-(5-nitro-2-furoyl)-p-nitrobenzamidoxime melting at 198° C. Analysis calculated: C=45.01%; H=2.52%; N=17.50%. Found: C=45.07%; H=2.49%; N=17.67%.

EXAMPLE 5

*O-(5-nitro-2-furoyl)-isonicotinicamidoxime*

This compound was prepared by the reaction of isonicotinicamidoxime (M.P.=200° C.) and 5-nitro-2-furoyl chloride as described in Example 1. M.P.=177° C. Analysis calculated: C=47.83%; H=2.92%; N=20.29%. Found: C=47.83%; H=2.98%; N=20.18%.

EXAMPLE 6

*O-(5-nitro-2-furoyl)-p-aminobenzamidoxime*

The reaction of equimolar amounts of 5-nitro-2-furoyl chloride and p-aminobenzamidoxime melting at 171° C. as described in Example 1 resulted in the formation of the desired amidoxime which melted at 235° C. with decomposition. Analysis calculated: C=49.66%; H=3.47%. Found: C=50.29%; H=3.52%.

In like manner, the reaction of any R-substituted amidoxime wherein R is as hereinbefore indicated with a 5-nitro-2-furoyl halide will evolve hydrohalide of reaction and result in the formation of the corresponding R-substituted-5-nitro-2-furoylamidoximes. Representative of such compounds considered to be within the scope of this invention are:

O-(5-nitro-2-furoyl)-benzamidoxime melting at 170° C.,
O-(5-nitro-2-furoyl)-formamidoxime
O-(5-nitro-2-furoyl)-bromoacetamidoxime
O-(5-nitro-2-furoyl)-acetamidoxime
O-(5-nitro-2-furoyl)-isobutyramidoxime
O-(5-nitro-2-furoyl)-valeramidoxime
O-(5-nitro-2-furoyl)-2-furylamidoxime
O-(5-nitro-2-furoyl)-2-thienylamidoxime
O-(5-nitro-2-furoyl)-2-carboxamidoacetamidoxime
O-(5-nitro-2-furoyl)-2-(5-bromofuryl)-amidoxime
O-(5-nitro-2-furoyl)-2-(5-bromothienyl)-amidoxime
O-(5-nitro-2-furoyl)-N-benzoylaminoacetamidoxime
O-(5-nitro-2-furoyl)-cyanoacetamidoxime
O-(5-nitro-2-furoyl)-phenylacetamidoxime
O-(5-nitro-2-furoyl)-t-butylaminoacetamidoxime
O-(5-nitro-2-furoyl)-diethylaminoacetamidoxime
O-(5-nitro-2-furoyl)-phenoxyacetamidoxime
O-(5-nitro-2-furoyl)-carboxyoxalamidoxime
O-(5-nitro-2-furoyl)-carbomethoxyoxalamidoxime
O-(5-nitro-2-furoyl)-β-carbomethoxypropionamidoxime
O-(5-nitro-2-furoyl)-o-chlorobenzamidoxime
O-(5-nitro-2-furoyl)-p-methoxybenzamidoxime
O-(5-nitro-2-furoyl)-o-methylthiobenzamidoxime
O-(5-nitro-2-furoyl)-3-isoxazylamidoxime
O-(5-nitro-2-furoyl)-4(5)-imidazylamidoxime
O-(5-nitro-2-furoyl)-4-oxazylamidoxime
O-(5-nitro-2-furoyl)-2-pyrimidylamidoxime
O-(5-nitro-2-furoyl)-2-pyrazinylamidoxime
O-(5-nitro-2-furoyl)-4-thiazylamidoxime
O-(5-nitro-2-furoyl)-1-phenyl-4-pyrazylamidoxime
O-(5-nitro-2-furoyl)-2-quinolylamidoxime
O-(5-nitro-2-furoyl)-1-isoquinolylamidoxime
O-(5-nitro-2-furoyl)-3-pyridylacetamidoxime
O-(5-nitro-2-furoyl)-p-acetylaminobenzamidoxime
O-(5-nitro-2-furoyl)-2-furylacetamidoxime and
O-(5-nitro-2-furoyl)-2-thienylacetamidoxime The R-substituted amidoximes employed as one of the starting materials are known compounds or can be readily prepared by refluxing equimolar amounts of an alkali metal hydroxide, hydroxylamine hydrochloride and a nitrile of the formula R—C≡N in an inert solvent such as ethanol. The solution is then filtered and the filtrate concentrated to recover the desired amidoxime as a residue which can be purified by recrystallization from a suitable solvent.

We claim:
1. O-(5-nitro-2-furyl)-isonicotinicamidoxime.
2. O-(5-nitro-2-furyl)-picolinicamidoxime.
3. A compound of the formula

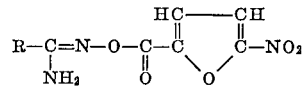

wherein R is selected from the group consisting of pyridyl, furyl, thienyl, pyrimidyl, halofuryl, halothienyl, oxazyl, isoxazyl, quinolyl, pyrazyl, pyridylloweralkyl, furylloweralkyl, thienylloweralkyl, imidazyl, pyrazinyl, thiazyl, and isoquinolyl.

References Cited by the Examiner
UNITED STATES PATENTS
3,084,170   4/1963   Von Esch et al. _____ 260—347.7

OTHER REFERENCES
Berichte: vol. 19, 1885, p. 1078.
Houben-Wehl: Methoden der Organishen Chemie Band VIII, 1952, pp. 652–3.

WALTER A. MODANCE, *Primary Examiner.*

A. L. ROTMAN, *Assistant Examiner.*